United States Patent

Lundberg et al.

Patent Number: 5,449,525
Date of Patent: Sep. 12, 1995

[54] METHOD FOR CATING A MAGNETIC RECORDING MEDIUM AND APPARATUS

[75] Inventors: David J. Lundberg, Maplewood; David R. Boston, Woodbury; Delbert L. Olson, St. Paul; William L. Kausch, Cottage Grove, all of Minn.

[73] Assignee: Minnesota Mining and Manufacturing Company, St. Paul, Minn.

[21] Appl. No.: 375,490

[22] Filed: Jan. 19, 1995

[51] Int. Cl.$^6$ ............................................. H01F 10/02
[52] U.S. Cl. .................................. 427/128; 118/123;
 118/407; 118/419; 427/358; 427/369;
 427/385.5; 427/430.1
[58] Field of Search ............ 427/128, 358, 369, 385.5,
 427/430.1; 118/123, 407, 419

[56] References Cited

U.S. PATENT DOCUMENTS

| | | | |
|---|---|---|---|
| 3,734,874 | 5/1973 | Kibler et al. | 260/29.2 |
| 3,779,993 | 12/1973 | Kibler et al. | 260/75 |
| 4,052,368 | 10/1977 | Larson | 260/75 |
| 4,104,262 | 8/1978 | Schade | 528/295 |
| 4,203,769 | 5/1980 | Guestaux | 430/631 |
| 4,304,901 | 12/1981 | O'Neill et al. | 528/290 |
| 4,307,219 | 12/1981 | Larson | 528/71 |
| 4,330,588 | 5/1982 | Larson et al. | 428/264 |
| 4,503,198 | 3/1985 | Miyai et al. | 525/440 |
| 4,521,459 | 6/1985 | Takeda | 427/359 |
| 4,558,149 | 12/1985 | Larson | 560/14 |
| 4,645,686 | 2/1987 | Suzuki | 427/48 |
| 4,746,717 | 5/1988 | Larson | 528/68 |
| 4,870,920 | 10/1989 | Kageyama et al. | 118/103 |
| 4,885,384 | 12/1989 | Steinmetz et al. | 562/406 |
| 4,911,950 | 3/1990 | Horikoshi et al. | 427/48 |
| 5,006,451 | 4/1991 | Anderson et al. | 430/527 |
| 5,203,884 | 4/1993 | Buchanan et al. | 51/295 |

*Primary Examiner*—Bernard Pianalto
*Attorney, Agent, or Firm*—Gary L. Griswold; Walter N. Kirn; Roger R. Tamte

[57] ABSTRACT

A method for producing a magnetic recording medium while minimizing electrostatic charge buildup on the medium during production. The method comprises applying a liquid material over a surface of a moving web to form a continuous wet coating thereon and smoothing the wet coating with a flexible blade having two major surfaces. The flexible smoothing blade comprises a conductive layer and is positioned so that a portion of one major surface is in contact with the wet coating so that electrostatic charge on the coated web is continuously dissipated.

15 Claims, 1 Drawing Sheet

METHOD FOR CATING A MAGNETIC RECORDING MEDIUM AND APPARATUS

BACKGROUND OF THE INVENTION

1. Field of the Invention

This invention relates to the manufacture of a magnetic recording medium, and more particularly to a method of smoothing a wet coating on the medium while also dissipating electrostatic charge from the medium.

2. Description of Related Art

The manufacture of magnetic recording media, such as ½ inch VHS video tape, typically involves coating a moving web with a solvent-based material. During coating, the web contacts various processing equipment, such as rollers, at high speeds. Since the web is usually an insulating material such as polyester film, this contact can result in the buildup of electrostatic charge (i.e., "static electricity") on the web. The accumulated charge, if not dissipated, can result in a variety of undesirable consequences, including the attraction of foreign substances such as dirt to the surface of the medium. A medium contaminated in this way may in turn be affected by dropouts and head-to-tape spacing loss, thereby depreciating the quality of data transfer from the medium. In addition, if the charge accumulates beyond the breakdown potential of the surrounding air, a spark will be discharged which may ignite the solvent-rich atmosphere in the coating area.

To reduce the occurrence of such discharges and the associated risk of fire, electrostatic charge has been at least partially removed from the moving web using devices such as inductive needle bars, electrically powered bars and nuclear ionizing bars. As the coating speeds of magnetic media continue to increase for efficiency reasons, higher levels of electrostatic charge are expected to be generated, and less time will be available for charge removal by these known devices.

There is a growing interest in the use of antistatic agents to solve the problems created by the buildup of electrostatic charge. Antistatic agents, or "antistats", are electrically conductive materials that are capable of transporting charges away from areas where charge buildup is not desired. For example, antistats such as carbon black may be included in a magnetic or nonmagnetic dispersion coated on the magnetic recording medium itself to reduce the buildup of debris on the medium during converting and packaging. Such efforts to reduce electrostatic charge in the medium are primarily effective only after the coated dispersion is dry.

A process for coating dispersions on magnetic recording media using a method such as rotogravure often includes a smoothing device such as a blade or bar in contact with the wet coating to remove patterns and defects from the wet coating before it is dried, as described for example in U.S. Pat. No. 4,870,920.

SUMMARY OF THE INVENTION

The present invention provides a method for producing a magnetic recording medium while minimizing electrostatic charge buildup on the medium during production, comprising the steps of:

a) applying a liquid material over a surface of a moving web to form a continuous wet coating thereon; and b) smoothing the wet coating with a flexible blade having two major surfaces, the flexible smoothing blade comprising a conductive layer and being positioned so that a portion of one major surface is in contact with the wet coating so that electrostatic charge on the coated web is continuously dissipated. In one embodiment of the method of the present invention, the flexible smoothing blade comprises a substrate having two major surfaces and the conductive layer is provided on at least one major surface. In a preferred embodiment, the conductive layer comprises an electrically conductive material and a polymeric binder. In a particularly preferred embodiment, the conductive material comprises vanadium oxide in the form of whisker-shaped particles, the whisker-shaped particles having a length of at least 1.0 microns ($\mu$m).

As used herein, "wet coating" means a thin uniform layer of a liquid material containing one or more components, optionally dispersed in a solvent base. "Flexible" means that the smoothing blade is able to bend smoothly when placed in contact with a wet coating on a moving web according to the method of this invention. A smoothing blade without suitable flexibility might remain rigidly straight or bend with a sharp crimp. "Dissipated" means that sufficient electrostatic charge is removed from the surface of the wet coating so that the voltage at the surface is essentially zero when measured by a static detector such as a Model 709 Static Meter (3M) at a point shortly beyond the area where the smoothing blade contacts the wet coating. "Smoothing" means that patterns and defects are removed from the wet coating so that the coating appears uniform when visually inspected by means of transmitted light. "Whisker-shaped particle" means an acicular particle having a major axis (length) which is longer than a minor axis (width). "Aspect ratio" of an elongated, whisker-shaped particle refers to the ratio of length:width, or major axis:minor axis. "Vanadium oxide" means a single or mixed valence vanadium oxide in which the formal oxidation states of the vanadium ions are typically +4 and +5; in the art, such species are often referred to as $V_2O_5$. In a colloidal dispersion which has been aged several hours at 80° C. or more or several days at room temperature, vanadium oxide consists of whisker-shaped particles of vanadium oxide which preferably have a width in the range from 0.02 to 0.08 $\mu$m and length up to about 4 $\mu$m. "Sulfonated polymer" means a polymer comprising at least one unit containing a salt of a $-SO_3H$ group, preferably an alkali metal.

Incorporation of an electrically conductive material, preferably vanadium oxide, into the conductive layer of a flexible smoothing blade in a sufficient quantity aids in the dissipation of electrostatic charge from the moving web, thereby reducing both the tendency of the web to attract dirt and debris during production and the chances of sparking and possible fires in the coating area. The effectiveness of the smoothing blade of this invention has been observed to be independent of the relative humidity in the surrounding atmosphere.

DETAILED DESCRIPTION OF PREFERRED EMBODIMENTS

Figure 1:
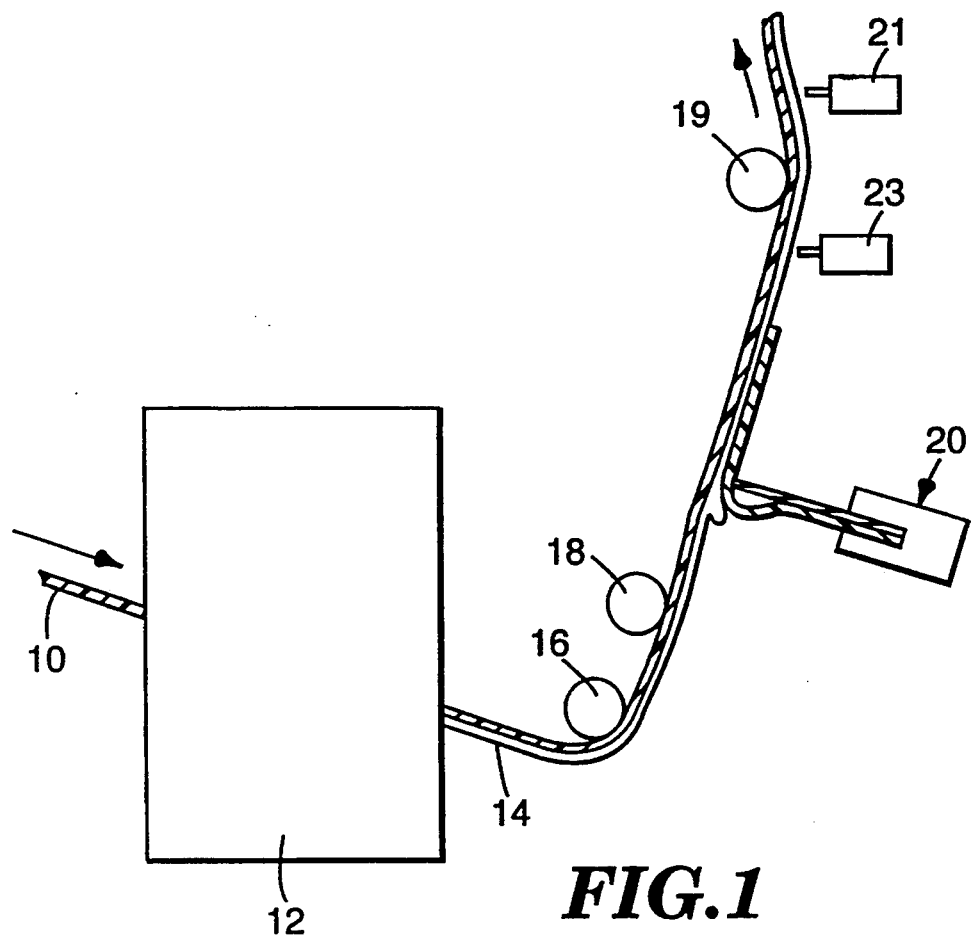
FIG. 1 is a process flow diagram for the inventive method of making a magnetic recording medium.

Referring now to FIG. 1, the method of the present invention proceeds as follows:

Web 10 moves through coating apparatus 12, where a liquid coating material is applied to one surface of the moving web to form a wet coating 14. The coating method may be chosen by one skilled in the art so as to provide a thin, uniform coating using a solvent-based coating material. Methods such as rotogravure, die, and curtain coating are suitable for the practice of the present invention. Certain of these methods may tend to produce a pattern in the coated web. The coated web moves over idler rolls 16 and 18 before the wet coating is smoothed by smoothing apparatus 20. The coated web then passes over idler roll 19. The number and position of idler rolls may vary depending upon the coating method used. Electrostatic charge may be measured on the coated web while the coating is still wet using static meters 21 and 23, positioned for example before and after idler roll 19, respectively. The web may then proceed to drying, further coating, slitting and converting steps which are well known in the art.

Figure 2:
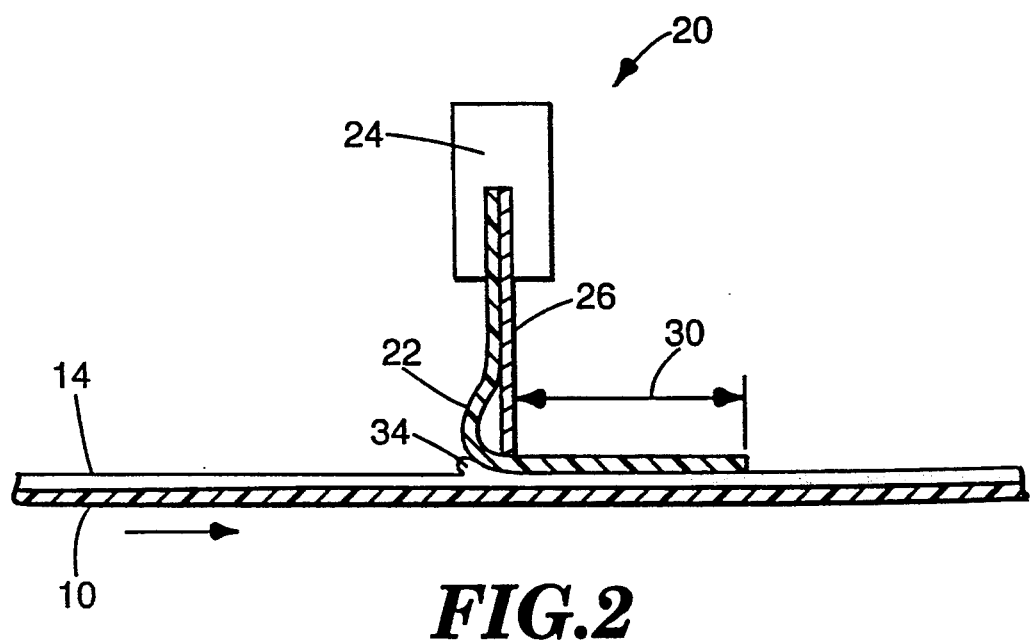
FIG. 2 depicts a flexible smoothing blade positioned according to this invention.

Smoothing apparatus 20, shown in more detail in FIG. 2, comprises a flexible smoothing blade 22 held in place by blade clamp 24. Blade clamp 24 may be any device which holds flexible smoothing blade 22 fixedly in place. Backup blade 26, also held by the blade clamp, extends from the blade clamp to a distance of about 1.25 inches (3.18 cm) from the surface of wet coating 14. The flexible smoothing blade, which has two major surfaces, curves smoothly around backup blade 26 without bends or crimps. The flexible smoothing blade contacts wet coating 14 on a portion of one major surface defining a contact length 30. Wet coating 14 lies on web 10, the web traveling at a controlled line speed in the direction shown. The contact length of the flexible smoothing blade in the direction of web travel is preferably in the range from about 3 to 8 cm. Preferably, a rolling bank 34 of excess coating material (shown in exaggerated size) is maintained along a line of contact (not shown) of the flexible smoothing blade with the wet coating. The backup blade provides support for the flexible smoothing blade as the flexible smoothing blade is drawn by friction in the direction of the moving web, and helps the flexible smoothing blade to maintain its position at the line of contact. The backup blade may be made of any solvent- and corrosion-resistant material of sufficient thickness and rigidity. One example of a suitable material for the backup blade is brass.

The flexible smoothing blade comprises a conductive layer for dissipating electrostatic charge from the wet coating. In one embodiment of this invention, flexible smoothing blade 22 comprises a substrate having two major surfaces and the conductive layer is provided on at least one major surface. In the case of a flexible smoothing blade having a conductive layer on only one major surface of the substrate, the conductive layer is preferably on the major surface which is in contact with the wet coating, as depicted in FIG. 2. Alternatively, but less preferably, the conductive layer may be on the major surface disposed away from the wet coating.

The substrate may be formed from any conductive or nonconductive material with sufficient flexibility to form a smooth radius of curvature during use and sufficient strength to withstand the forces exerted on it by the web traveling at high line speeds. When cut, the substrate must be capable of forming a clean edge free of defects such as burrs and nicks. Examples of suitable substrates include polyesters such as polyethylene terephthalate (PET); copolyesters; polyamides; polyimides; polyepoxides; polycarbonates; polyolefins such as polyvinyl chloride, polyvinylidene chlorides, polystyrene, polypropylene, and polyethylene; poly(vinylacetate); polyacrylates such as polymethylmethacrylate; and cellulosics.

The conductive layer of this embodiment preferably comprises an electrically conductive material and a polymeric binder. The electrically conductive material provides the flexible smoothing blade with the ability to continuously dissipate electrostatic charge from the coated web being smoothed. The conductive layer is preferably continuous and extends fully to all edges of the substrate.

In a particularly preferred embodiment of this invention, the conductive layer comprises vanadium oxide. The vanadium oxide is preferably present as particles which are acicular, or whisker-shaped, rather than spherical or granular. It is believed that these particles are evenly distributed in the conductive layer to form an electrically conductive particle network in which the particles are in physical contact. This particle-to-particle contact, or connectivity, is believed to form a conductive path which provides the excellent electrostatic charge dissipation characteristics of the conductive layer of this invention. The particles are preferably at least about 1.0 μm long. The aspect ratio (the ratio of length, i.e. long axis, to width, i.e. short axis) of the particles is generally in the range from about 4 to about 200. Particles of greater length are desirable, since fewer particles are then required to provide connectivity in the particle network. Particles having a length of more than about 4 μm are generally more difficult to make in a colloidal dispersion, and may be more unstable for handling and coating purposes.

Vanadium oxide may be available as a colloidal dispersion, or as dry particles. As used herein, "colloidal vanadium oxide" means a colloidal dispersion of single or mixed valence vanadium oxide, wherein the formal oxidation states of the vanadium ions are typically +4 and +5. The terms "sol," "colloidal dispersion," and "colloidal solution" are used interchangeably. They all refer to a uniform suspension of finely divided particles in a continuous liquid medium.

The use of colloidal dispersions of vanadium oxide is preferred in the present invention to provide a highly dispersed form of vanadium oxide. The vanadium oxide colloidal dispersions of the present invention contain at least a minimum effective amount of vanadium. By an "effective amount" of vanadium it is meant that the colloidal dispersion contains an amount of vanadium in the form of vanadium oxide which is suitable to make a flexible smoothing blade which can dissipate electrostatic charge according to the present invention. The dispersed vanadium oxide exhibits desirable morphology, particle size, and dispersion properties useful in the preparation of the conductive layer of this invention. Compatibilizing agents can be used to aid in maintaining the stability of these dispersions.

The effectiveness of a colloidal dispersion of vanadium oxide can be expressed in terms of the effective surface concentration of vanadium, $[V]_{eff}$, in the conductive layer. The effective surface concentration is described as the mass of vanadium per unit surface area, in units of mg/m², required to provide a flexible smoothing blade having useful electrostatic charge dissipation capabilities according to the present invention. Generally, a coating with a lower $[V]_{eff}$ is more transparent and uniform, and adheres better to the substrate.

Vanadium oxide colloidal dispersions may be prepared by a number of methods including the acidification of vanadate salts, the reaction of hydrogen peroxide with vanadium pentoxide, the hydrolysis of vanadium compounds such as halides and carboxylates, the dissolution of amorphous vanadium pentoxide in water, and the casting of molten vanadium pentoxide in water as described in U.S. Pat. No. 4,203,769.

A preferred method for producing vanadium oxide colloidal dispersions is by the hydrolysis of vanadium oxoalkoxides. Under proper conditions, vanadium oxide colloidal dispersions produced by the hydrolysis of vanadium oxoalkoxides are characterized by: high aspect ratio colloidal particles, as observed in the final coating state by field emission scanning electron microscopy; and well-dispersed particles which are not unacceptably agglomerated or flocculated. Assignee's copending U.S. patent application Ser. No. 08/253,194 filed Jun. 2, 1994, and entitled "Vanadium Oxide Colloidal Dispersions and Antistatic Coatings" describes the preparation of vanadium oxide by this method.

In the above-described process, a molar excess of water initially reacts with the vanadium oxoalkoxides in a hydrolysis reaction. By "molar excess" is meant that a sufficient amount of water is present relative to the amount of vanadium oxide such that there is a greater than 1:1 molar ratio of water to vanadium-bound alkoxide ligands. The hydrolyzed product subsequently undergoes a condensation reaction to form a mixed valence vanadium oxide colloidal dispersion containing ions in both the +4 and +5 oxidation states. Although the product is often referred to in the art as vanadium pentoxide ($V_2O_5$), its molecular formula can be more accurately represented as $V_2O_{4.67}$. This process preferably involves the addition of vanadium oxoalkoxides to the water, as opposed to adding the water to the vanadium oxoalkoxides. When the hydrolysis is exothermic, the vanadium oxoalkoxides are added at a controlled rate, with stirring, so that the reaction mixture temperature does not greatly exceed room temperature. The temperature of the reaction mixture can be further controlled by placing the reaction flask in a constant temperature bath, such as an ice water bath.

Preferably, deionized water is used (i.e., water with most $Ca^{+2}$ and $Mg^{+2}$ ions removed). The deionized water preferably contains less than about 50 ppm, more preferably less than 5 ppm, of these multivalent cations. Most preferably, the deionized water contains less than about 50 ppm of a total cation concentration, including multivalent cations and monovalent cations, such as $Na^+$.

Water useful in the methods of the present invention generally has a pH within a range of about 5 to about 9, which is sufficient to render colloidal dispersions with a pH in the range from about 1.5 to about 8. If the pH of the colloidal dispersion is less than about 1.5, the dispersion properties may be detrimentally affected so that the dispersion produces an inadequate conductive layer. If the pH of the colloidal dispersion is more than about 8, the dispersion tends to flocculate.

So long as there is an excess of water used in the hydrolysis and subsequent condensation reactions of the vanadium oxoalkoxides, water-miscible organic solvents can also be present. That is, in certain cases the vanadium oxoalkoxides can be added to a mixture of water and a water-miscible organic solvent. Such organic solvents include alcohols, low molecular weight ketones, dioxane, and solvents with a high dielectric constant, such as acetonitrile, dimethylformamide, dimethylsulfoxide, and combinations thereof. Preferably, the organic solvent is acetone or an alcohol, such as i-BuOH, i-PrOH, n-PrOH, n-BuOH, and t-BuOH.

A sufficient amount of water is used so that the colloidal dispersion formed therefrom contains about 0.05 weight % (wgt %) to about 3.5 weight % (wgt %) vanadium. Preferably, the colloidal dispersion formed upon addition of the vanadium-containing species contains about 0.6 wgt % to about 1.7 wgt % vanadium. Herein, these weight percentages are calculated from the amount of vanadium in the starting material used to prepare the dispersion, and are based on the total weight of the dispersion. Colloidal dispersions with a vanadium concentration greater than about 3.5 wgt % typically have poor dispersion properties, i.e., they are not dispersed well and tend to be gelatinous.

The vanadium oxoalkoxides used as a precursor in the preferred hydrolysis process are vanadium complexes with one oxide ligand (=O) and at least one alkoxide ligand (—OR) per vanadium atom. They may include ligands other than the oxide and alkoxide groups, such as carboxylates, sulfides, selenides, $\beta$-diketonates, halides, and pseudohalides such as —SCN— and —CN—. The vanadium oxoalkoxides useful in the present invention may be monomeric, dimeric, or polymeric. Preferably, the vanadium oxoalkoxides are of the formula VO-$(OR)_3$, i.e., vanadium oxotrialkoxides, wherein each R is independantly an aliphatic, aryl, heterocyclic, or arylalkyl group, and may be substituted or unsubstituted. Herein, a "substituted" R group means that one or more hydrogen atoms are replaced by a functional group that is nonreactive to hydrolysis, and noninterfering with the formation of colloidal dispersions. Preferably, each R is independently selected from the group consisting of $C_{1-10}$ alkyl, $C_{1-10}$ alkenyl, $C_{1-10}$ alkynyl, $C_{1-18}$ aryl, $C_{1-18}$ arylalkyl, or mixtures thereof, which may be substituted or unsubstituted. If these groups are substituted, they are preferably substituted with a functional group such as a halide, hydroxide, thiol, carbonyl, or mixtures thereof. More preferably, each R is independently an unsubstituted $C_{1-6}$ alkyl group. Each R being independent means that not all R groups in the formula VO-$(OR_3)$ are required to be the same.

In the context of the present invention, the term "aliphatic" means a saturated or unsaturated linear, branched or cyclic hydrocarbon group. This term is used to encompass alkyls, alkenyls such as vinyl groups, and alkynyls, for example. The term "alkyl" means a saturated linear or branched hydrocarbon group. The term "alkenyl" means a linear or branched hydrocarbon group containing at least one carbon-carbon double bond. The term "alkynyl" means a linear or branched hydrocaron group containing at least one carbon-carbon triple bond. The term "heterocyclic" means a mono- or polynuclear cyclic group containing carbons and one or more heteroatoms such as nitrogen, oxygen, or sulfur or a combination thereof in the ring or rings, such as furan, thymine, hydantoin, and thiophene. It is preferred that any nitrogen atoms in the heterocyclic group be no more than weakly basic. The term "aryl" means a mono- or polynuclear aromatic hydrocarbon group. The term "arylalkyl" means a linear, branched, or cyclic alkyl hydrocarbon group having a mono- or polynuclear aromatic hydrocarbon or heterocyclic substituent. The aliphatic, aryl, heterocyclic, and arylalkyl groups can be unsubstituted, or they can be substituted with various substituents such as Br, Cl, F, I, OH and the like.

In a preferred method, the vanadium oxoalkoxides are prepared in situ from a vanadium oxide precursor species and an alcohol. In this way, the vanadium oxoalkoxides can be generated in the same vessel in which the hydrolysis and subsequent condensation reactions occur. For example, the vanadium oxoalkoxides can be generated by combining a vanadium oxide precursor species, such as a vanadium oxyhalide ($VOX_3$) (preferably $VOCl_3$), vanadium oxyacetate ($VO_2OAc$), and combinations thereof, with an appropriate alcohol, such as i-BuOH, i-PrOH, n-PrOH, n-BuOH, and t-BuOH. It is understood that if vanadium oxoalkoxides are generated from a vanadium oxide precursor species and an alcohol, they may contain ligands other than oxide and alkoxide ligands. For example, the product of the reaction of vanadium oxyacetate with an alcohol is a mixed alkoxide/acetate. Thus, herein the term "vanadium oxoalkoxide" is used to refer to species that have one oxide (=O) ligand and at least one alkoxide (—OR) ligand per vanadium atom, particularly if prepared in situ, i.e., without isolation and/or purification of the vanadium oxoalkoxide. Preferably, however, the vanadium oxoalkoxides are trialkoxides with one oxide and three alkoxide ligands.

The in situ preparations of the vanadium oxoalkoxides are preferably carried out under a dry, nonoxidizing atmosphere such as nitrogen or argon. The vanadium oxide precursor species is typically added to an appropriate alcohol at room temperature. For an exothermic reaction, it is preferable to add the vanadium oxide precursor species at a controlled rate such that the reaction mixture does not greatly exceed room temperature. The temperature of the reaction mixture can be further controlled by placing the reaction flask in a constant temperature bath, such as an ice water bath. When the vanadium oxide precursor species is an oxohalide, the reaction between it and the alcohol should be conducted in the presence of an oxirane, such as propylene oxide, ethylene oxide, or epichlorohydrin. The oxirane is effective at removing by-products of the reaction of the vanadium oxide species with alcohols. If desired, volatile starting materials and reaction products can be removed through distillation or evaporative techniques, such as rotary evaporation. The resultant vanadium oxoalkoxide product, whether in the form of a solution or a solid residue after the use of distillation or evaporative techniques, can be combined directly with water to produce the vanadium oxide colloidal dispersions of the present invention.

Preferably, the reaction mixture contains an effective amount of a hydroperoxide, such as $H_2O_2$ or t-butyl hydroperoxide. An "effective amount" of a hydroperoxide is an amount that results in a colloidal dispersion which is less turbid, better dispersed, and capable of producing a conductive layer in a flexible smoothing blade of this invention with a value of $[V]_{eff}$ of less than about 10 mg/m$^2$. While not wishing to be held to any particular theory, we believe that the hydroperoxide accelerates the formation of acicular, i.e whisker-shaped, vanadium oxide colloidal particles. Preferably, the excess of water includes about 0.25 to about 1 mole of a hydroperoxide vanadium per mole of vanadium initially present.

After a colloidal dispersion of vanadium oxide is formed by this method, it must be aged for a time sufficient to allow the initially formed particles of vanadium oxide to coalesce into the desired whisker shape. Aging typically involves storing the solution in a constant temperature bath until a thixotropic colloidal dispersion is formed. Temperature is an important factor in the successful aging of these dispersions. The period of aging may range from about 8 hours to many weeks, depending upon the temperature. Aging of the dispersion at 20° C., for example, may take as long as about 4 months. Aging at 90° C., however, can be carried out in about 8 hours. High aging temperatures, such as 90° C., may cause evaporative loss of water from the dispersion making accurate concentration determination difficult, making handling and dilution more difficult, and may result in a wider size distribution of the colloidal vanadium oxide particles. Further, over-aging the dispersion can degrade the effectiveness of the dispersion for preparing conductive layers by increasing $[V]_{eff}$.

Preferably, the dispersions are aged at a temperature in the range from about 40° C. to about 90° C. for about 8 hours to about 14 days. More preferably, the dispersions are aged at a temperature in the range from about 50° C. to about 60° C. for about 4 to about 8 days. These temperatures are preferred because they are convenient to use and allow production of useful coatings within a reasonable period of time. The time for aging at the specified temperatures is believed to provide the best dispersions in terms of providing a flexible smoothing blade with desirable electrostatic charge dissipation capabilities while having the lowest possible concentrations of vanadium. A low coating weight is advantageous because a coating results which is more uniform, less colored, less expensive, more resistant to solvents, and may be more receptive to the adhesion of subsequently applied layers, as well as more adherent to the underlying substrate.

Other electrically conductive materials may be used in this embodiment instead of vanadium oxide. Generally, suitable materials include acicular or whisker-shaped particles having a length of at least about 1.0µ. Such materials must be capable of forming a coating or film which is resistant to solvents used in the manufacture of magnetic recording media. An example of such a material is commercially available carbon fibers.

In this embodiment, the conductive layer also contains a polymeric binder for improving adhesion of the conductive layer to the underlying substrate and improving the cohesive strength of the conductive layer. Such a binder thereby improves the solvent resistance, abrasion resistance and overall durability of the flexible smoothing blade. Water dispersible sulfonated polymers are advantageous for the polymeric binder of this invention when the conductive material is vanadium oxide because of their relative compatibility with colloidal vanadium oxide. Such polymers include those which have been disclosed in U.S. Pat. Nos. 4,052,368, 4,307,219, 4,330,588, 4,558,149, 4,738,992, 4,746,717, and 4,855,384, which describe the composition and preparation of sulfonated polymers and sulfonated compounds. Assignee's copending U.S. Pat. application Ser. No. 07/893,279, Attorney's Docket Number 48349USA1A, entitled "Sulfopolymer/Vanadium Oxide Antistatic Compositions" describes the preparation and use of sulfonated polymers as binders for vanadium oxide.

Water dispersible sulfonated polyesters are known in the literature and are utilized for a wide variety of applications including primers, size coats, subbing for photographic emulsions, hydrophilic coatings for stain release, lithographic binders, hair grooming, and adhesives. In some instances, these sulfonated polyesters are dispersed in water in conjunction with an emulsifying agent and high shear to yield a stable emulsion; sulfonated polyesters may also be completely water soluble. Additionally, stable dispersions may be produced in instances where sulfonated polyesters are initially dissolved in a mixture of water and an organic cosolvent, with subsequent removal of the cosolvent yielding an aqueous sulfonated polyester dispersion. Sulfonated polyesters disclosed in U.S. Pat. Nos. 3,734,874, 3,779,993, 4,052,368, 4,104,262, 4,304,901, 4,330,588, for example, relate to low melting (below 100° C.) or non-crystalline sulfonated polyesters which may be dispersed in water according to methods mentioned above.

Water dispersible sulfonated polyurethanes or sulfonated polyurethane/ureas are known in the literature and are widely utilized as textile and paper coatings, binders for nonwoven webs, adhesives, size coats for glass and fiber, abrasion resistant coatings, etc. Sulfonated polyurethanes may be synthesized by a wide variety of methods. One major class of random, linear sulfonated polyurethanes is disclosed in U.S. Pat. No. 4,307,219.

Water dispersible ethylenically unsaturated sulfonated compounds are known in the literature, for example U.S. Pat. Nos. 4,503,198, 4,558,149, 4,746,717, and 4,855,384. These energy-curable sulfonated compounds may be used to form crosslinked, adherent, abrasion-resistant coatings.

A dispersion of sulfonated polymer in water typically contains more than zero and up to about 50% by weight sulfonated polymer.

Alternatively, but less preferably, water dispersible non-sulfonated polymers that are compatible with the above-described colloidal dispersions of conductive materials can be incorporated into the conductive layer as a polymeric binder. Nonsulfonated polymers or prepolymers include polymethyl methacrylate, polyethyl acrylate, polystyrene, polystyrene/butadiene copolymers, polyvinylidene chloride, cellulose acetate, nitrocellulose, and cellulose acetate butyrate, and precursors thereof.

A vanadium oxide dispersion can be generated in the presence of a polymeric binder by, for example, the addition of $VO(OBu)_3$ (vanadium triisobutoxide oxide) to a dispersion of polymeric binder, optionally containing hydrogen peroxide, and aging this mixture at 50° C. for several hours to several days. In this way, colloidal vanadium oxide dispersions can be prepared in situ with dispersions of polymeric binder with which they might otherwise be incompatible (as evidenced by flocculation of the colloidal dispersion). In addition, this method simply may be a more convenient preparation method for some dispersions. Alternatively, the polymeric binder may be prepared as a separate dispersion and subsequently mixed with a vanadium oxide dispersion.

The polymeric binder is present in the conductive layer preferably in the range from 25 to 99 weight %, and more preferably 65 to 85 weight %, based on total dried solids of polymeric binder and vanadium oxide.

In addition to the vanadium oxide and the polymeric binder, the conductive layer may also comprise one or more additives such as dispersants, stabilizers, surfactants, wetting agents, solvents, and the like in accordance with practices known in the art, provided such additives do not cause flocculation or precipitation of the polymeric binder dispersion or the vanadium oxide dispersion. Preferred wetting agents include ethanol and TRITON X-100 nonionic surfactant from Rohm & Haas Co.

In this embodiment, the conductive layer can be prepared by coating a colloidal dispersion of the above-described ingredients onto the substrate. To prepare the dispersion, the vanadium oxide dispersion and the polymeric binder dispersion (if not formulated in situ) are combined in a suitable vessel such as a polyethylene container or a polyethylene-lined container, and agitated at room temperature until thoroughly mixed. Glass containers may destabilize the dispersion and should be avoided. Contact of the vanadium oxide dispersion with metals other than stainless steel should be avoided during the mixing process due to the tendency of the vanadium oxide to complex with metal ions and precipitate. An effective method of agitation is, for example, an impeller-type mixer on low speed or gentle agitation by hand with a wooden paddle or spatula. Agitation which is too rapid may destabilize the dispersion. Additional ingredients, if any, are then generally added one at a time to the mixture with agitation. For ease of coating, the final coating dispersion generally has a vanadium oxide concentration of less than or equal to about 0.75% by weight of solution and a polymeric binder concentration of less than about 3% by weight of solution. The dispersion may be filtered before coating.

To make the flexible smoothing blade, the substrate may advantageously be slit into a roll whose width is the same as the desired length of the smoothing blade. The coating dispersion is then applied to one major surface of the substrate to form a continuous coating extending fully to the edges of the substrate. Any suitable coating method such as knife coating, curtain coating, rotogravure coating or die coating may be used in accordance with practices known in the art. The coated substrate is subsequently dried, giving a dried conductive layer with a caliper in the range from about 2 microinches (0.05 μm) to about 10 microinches (0.25 μm). Prior to coating, the substrate may be treated using a method such as corona treatment to improve the wetting of the coating mixture on the substrate. The other major surface of the substrate may then be treated, coated and dried in a like manner, although a conductive layer on a second major surface of the flexible smoothing blade is not required for this invention. It is within the scope of the present invention to incorporate a protective layer over the conductive layer on the smoothing blade for a purpose such as abrasion resistance, solvent resistance, friction reduction, and the like. In an alternative method, the coating dispersion may be applied to the substrate, followed by slitting the coated substrate to the desired width. In either case, the coated substrate is then converted to a size and shape (generally rectangular) appropriate for use as a smoothing blade.

The concentration of vanadium, [V], in the conductive layer is preferably in the range from about 1 to 20 mg/m², and more preferably about 3 to 10 mg/m². A desirable [V] in this range can be selected based on line speed and other coating conditions known to contribute to electrostatic charge generation. [V] is measured by ashing a piece of smoothing blade material weighing between about 3 and 4 g in a furnace at 650° C. The weight of the material remaining after ashing is used to calculate [V]. Sufficient concentration of vanadium ensures connectivity of the $V_2O_5$ particles which in turn maximizes the electrostatic charge dissipating ability of the flexible smoothing blade.

In another embodiment of the invention, the conductive layer comprises an electrically conductive material which is a metallic element such as aluminum, copper, or gold. In this embodiment, the conductive layer is applied to at least one major surface of the substrate at a thickness sufficient to provide a flexible smoothing blade having useful electrostatic charge dissipation capabilities. A particularly preferred method of application of the conductive layer is vapor deposition, but other methods suitable for applying thin layers of metallic elements may also be used.

In this embodiment, a protective layer comprising a polymeric material such as polyester is preferably applied over the conductive layer to increase abrasion resistance of the flexible smoothing blade and protect the conductive layer from degradation by solvents, oxidation, and the like. The protective layer is preferably thin enough so as not to appreciably reduce the electrostatic charge dissipation capabilities of the flexible smoothing blade, while thick enough to improve the durability of the flexible smoothing blade. The protective layer may be applied using any method suitable for the application of thin uniform layers of polymeric materials. Examples of such methods include rotogravure coating, die coating, spray coating, air knife coating, and the like. The coated material of this embodiment is then converted as described above to produce the flexible smoothing blade of this invention. This embodiment is less preferable because of the potentially high cost of materials and application methods, and the potential for generation of contaminants harmful to magnetic recording media.

The flexible smoothing blade is characterized preferably by a rectangular shape having a width at least as wide as the coated web to be smoothed, and a length of at least about 2.5 in (6.4 cm). The portion of the length of the flexible smoothing blade which is in contact with the wet coating is herein referred to as the contact length, as depicted in FIG. 2. The contact length required to provide adequate smoothing and electrostatic charge dissipation is partially affected by the line speed used during coating.

The edges of the smoothing blade, particularly the edges that contact the wet coating, are substantially free of defects such as burrs and nicks. The flexible smoothing blade has sufficient flexibility such that it curves smoothly around a backup blade without crimping when used to smooth a wet coating in the process of this invention. The surface resistivity of the flexible smoothing blade according to ASTM D257 is typically in the range from about $10^7$ to about $10^{11}$ ohm/sq for the major surface or surfaces having the conductive layer. Static charge decay as measured by Federal Testing Method 4046 is preferably less than 0.01 sec for a 5000 V charge on the major surface or surfaces having the conductive layer. The flexible smoothing blade preferably is sufficiently durable such that the ability of the blade to dissipate electrostatic charge is not significantly reduced after a reasonable length of time, such as 0.5 to 1.0 hour of use in a production setting. The electrostatic charge dissipation ability of the flexible smoothing blade has been observed to be independent of the relative humidity of the surrounding atmosphere.

Objects and advantages of this invention are further illustrated by the following Examples. The particular materials and amounts thereof, as well as other conditions and details, recited in these examples should not be used to unduly limit this invention.

For the purposes of these Examples, surface resistivity was measured using a circular guarded electrode apparatus as described in ASTM D257. Electrostatic charge decay was measured according to Federal Testing Method 4046 by inducing a potential of 5000 V to the flexible smoothing blade using electrodes, grounding the electrodes and measuring the time required for the voltage to drop below 50 V using a Static Decay Meter Model 406C (ElectroTech Systems, Inc.; Glenside, Pa.). A shorter electrostatic charge decay time is thought to indicate greater ability to dissipate electrostatic charge.

EXAMPLE 1 a. Preparation of Sulfonated Polyester

A one gallon polyester kettle was charged with 111.9 g (5.5 mole %) 5-sodiosulfoisophthalic acid, 592.1 g (47.0 mole %) terephthalic acid, 598.4 g (47.5 mole %) isophthalic acid, 705.8 g ethylene glycol, 59.9 g neopentyl glycol, 0.7 g antimony oxide, and 2.5 g sodium acetate. The mixture was heated with stirring to 230° C. at 345 kPa (50 psi) under nitrogen for 2 hours, during which time water evolution was observed. The temperature was increased to 250° C. and the pressure was then reduced, vacuum was applied (0.2 toro, and the temperature was increased to 270° C. The viscosity of the material increased over a period of 45 minutes, after which time a high molecular weight, clear, viscous sulfopolyester was drained. This sulfopolyester was found by Differential Scanning Calorimetry (DSC) to have a glass transition temperature, $T_g$, of 70.3° C. The theoretical sulfonate equivalent weight was 3847 g polymer per mole of sulfonate. 500 g of the polymer was dissolved in a mixture of 2000 g water and 450 g isopropanol at 80° C. The temperature was then raised to 95° C. in order to remove the isopropanol (and a portion of the water), yielding a 22% solids aqueous dispersion.

b. Preparation of Colloidal Vanadium Oxide

Vanadium triisobutoxide oxide (VO(O-iBu)$_3$) (15.8 g, 0.055 moles, Akzo Chemicals, Inc., Chicago, Ill.) was added to a rapidly stirred solution of hydrogen peroxide (1.56 g of 30% aqueous solution, 0.0138 moles, Mallinckrodt, Paris, Ky.) in deionized water (232.8 g) at room temperature giving a solution with vanadium concentration equal to 0.22 moles/kg (2.0% $V_2O_5$). Upon addition of the vanadium isobutoxide, the mixture became dark brown and gelled within five minutes. With continued stirring, the dark brown gel broke up giving an inhomogeneous, viscous dark brown solution which was homogeneous in about 45 minutes. The sample was allowed to stir for 1.5 hours at room temperature. It was then transferred to a polyethylene bottle and aged in a constant temperature bath at 50° C. for 6 days to give a dark brown thixotropic gel.

The concentration of V(+4) in the gel was determined by titration with potassium permanganate to be 0.072 moles/kg. This corresponded to a mole fraction of V(+4) [i.e., V(+4)/total vanadium] of 0.33.

The colloidal vanadium oxide was then further mixed with deionized water to form a dispersion containing 1 wgt % vanadium oxide.

c. Preparation of Flexible Smoothing Blade

Two samples of a coated substrate were produced as follows: 4000 g of vanadium oxide sol as prepared above (1 wgt % in deionized water) was combined with 4000 g of deionized water in a container having a polyethylene liner. The diluted sol was gently stirred with a wooden spatula while 190 g of the sulfonated polyester as prepared above (21 wgt % in deionized water) was added to the vessel. After gently agitating the mixture for 2 minutes, 160 g of acetyl acetone was added followed by 10 minutes of occasional agitation. It is believed that acetyl acetone may act as a stabilizer. 7650 g of ethanol and 96 g of TRITON X-100 nonionic surfactant (10 wgt % in water) from Rohm & Haas Co. were then added, and the resulting mixture was agitated for an additional 5 minutes. The solution was prefiltered with a 15 μm acroversal filter (TEK Products, Eden Prairie, Minn.) and then filtered with a HC50AG HT filter (Roki Techno Co., Ltd.) just prior to coating.

The solution was coated onto one side of a 5 mil(127 μm) thick, 3.5 inch (8.9 cm) wide PET film substrate at approximately 200 microinches (5 μm) wet caliper, using a rotogravure method of coating at a line speed of 102 fpm (31.1 m/min). The substrate had been corona treated at a power of 220–240 W prior to coating to improve the wettability of the coating solution on the substrate. The coated substrate was then dried at 170° F. (76.7° C.) and rolled into a stockroll. 27 inch (68.6 cm) long samples (one side coated) were then cut from the stockroll and tested. The stockroll was then coated on the opposite side and dried as described above. 27 inch (68.6 cm) long samples (two sides coated) were then cut from the stockroll and tested. Surface resistivity of both samples was $2 \times 10^8$ ohm/sq on the coated side and the electrostatic charge decay time was less than 0.01 sec on the coated side.

EXAMPLE 2

To prepare a flexible smoothing blade of the present invention, a coating solution was first prepared using the following formulation:

| Ingredient | Quantity [g] |
| --- | --- |
| Vanadium oxide sol (1 wgt % in DI water) as prepared in Example 1 | 250 |
| Sulfonated polyester (22 wgt % in DI water) as prepared in Example 1 | 11.9 |
| 2,4 pentanedione (also known as acetyl acetone) | 10 |
| Deionized water | 200 |
| TRITON X-100 surfactant (10 wgt % in water) (Rohm & Haas Co.) | 30 |
| 3A Ethanol (90% ethanol, 5% methanol, 5% isopropanol) | 500 |

The above ingredients were added successively to a polyethylene jar, with agitation provided by a magnetic stirrer. The resulting solution was filtered with a 15 μm filter just prior to coating.

The solution was coated onto a 3.5 in (8.9 cm) wide, 5 mil (127 μm) thick PET substrate by means of a gravity fed knife coater and dried at about 185° F. for 2 minutes. The resulting coated substrate appeared to be pale yellow in color. The coated substrate was tested for durability first by rubbing a finger across the coating, second by applying masking tape to the coating and pulling the tape rapidly off, and third by soaking the coated substrate in MEK solvent for about 5 minutes and then allowing it to dry in air. No coating was visibly removed by any of these tests, as would be indicated by the absence of the pale yellow color on the transparent substrate. The surface resistivity of the coated substrate on the coated side was about $2 \times 10^7$ ohm/sq, and the electrostatic charge decay time on the coated side was less than 0.01 sec.

EXAMPLE 3

To prepare a flexible smoothing blade of the present invention, a coating solution was first prepared using the following formulation:

| Ingredient | Quantity [g] |
| --- | --- |
| Vanadium oxide sol (1 wgt % in DI water) as prepared in Example 1 | 500 |
| Sulfonated polyester (21 wgt % in water) as prepared in Example 1 | 21 |
| Deionized water | 450 |
| TRITON X-100 surfactant (10 wgt % in water) (Rohm & Haas Co.) | 60 |

The above ingredients were added successively to a polyethylene vessel, with agitation provided by a magnetic stirrer. The resulting solution was filtered with a 15 μm filter just prior to coating.

The dispersion was coated onto a 3.5 in (8.9 cm) wide, 5 mil (127 μm) thick PET film substrate by means of a polyester drag applicator placed across the width of the substrate, such that the applicator was approximately 0.25 in (0.64 cm) wider on each side than the substrate. The coating was then dried at about 185° F. (85° C.) for 2 minutes, and the coated substrate was rolled into a stockroll. Samples were cut from the stockroll and tested on the coated side. The surface resistivity was about $1 \times 10^8$ ohm/sq, and the electrostatic charge decay time was less than 0.01 sec. A sample of the PET substrate without the coating was evaluated for comparative purposes and found to have a surface resistivity of about $1 \times 10^{15}$ ohm/sq and an electrostatic charge decay time of greater than 20 seconds.

EXAMPLE 4

Flexible smoothing blades were prepared from coated substrates produced in Examples 1 and 3 by cutting 27 in (68.6 cm) long pieces from the 3.5 in (8.9 cm) wide stockrolls. The blades were used in the coating of a magnetic recording medium to evaluate the ability of the blades to dissipate electrostatic charge from the medium during coating. First, a nonmagnetic backside dispersion was prepared according to the following formulation:

| Ingredient | Parts by weight |
| --- | --- |
| Main Charge | |
| Carbon Acetylene Black, 50 nm (Chevron Co.) | 3.59 |
| THERMAX N-911 Carbon Black, 270 nm (Cancarb Ltd.) | 0.91 |
| CENTROLEX P Dispersant, 58% solids in 2:1 MEK:toluene (Central Soya Corp.) | 0.62 |
| RD 676 Urethane Binder, 30% solids in MEK (3M) | 11.99 |
| PKHH Phenoxy Binder, 30% solids in MEK (Union Carbide Corp.) | 5.14 |

-continued

| Ingredient | Parts by weight |
| --- | --- |
| Activator Charge | |
| Dibutyltin Dilaurate Catalyst | 0.01 |
| PAPI Activator (The Dow Chemical Co.) | 1.42 |
| Myristic Acid, 3% solids in MEK | 0.82 |

The ingredients of the Main Charge were combined with sufficient solvent (60:35:5 blend of MEK:toluene:-cyclohexanone) to dilute the resulting solution to about 10% solids. The mixture was milled until a smooth dispersion was formed. Just prior to coating, the Activator Charge was combined and added to the dispersion.

The backside dispersion was then applied to one side of a 0.56 mil (14.2 μm) thick PET film substrate using a rotogravure coating method at a line speed of 1800 fpm (549 m/min), to a wet caliper of about 200 microinches (5 μm). The temperature in the coating area was about 72° F. (22° C.), and the relative humidity was between about 40 and 50%. The coating was followed directly by smoothing with one of the flexible smoothing blades, as shown in FIG. 1. In each test, the flexible smoothing blade was mounted as shown in FIG. 2, with either the conductive layer in contact with or away from the wet coating. Charge on the wet coated web was measured after smoothing and after contact with an idler roll (hereinafter referred to as position "A"), and also after smoothing and before contact with an idler roll (hereinafter referred to as position "B") as shown in FIG. 1, using a Model 709 Static Meter. Each flexible smoothing blade was used for a length of time sufficient to coat one 16,000 foot (4877 m) long stockroll of magnetic media. In addition, charge was measured when coating the web without a flexible smoothing blade at all. The blades were then removed and evaluated for durability of the conductive layer using X-ray fluorescence spectroscopy.

The results are as follows: Without use of a flexible smoothing blade, the charge on the web in both positions A and B was approximately 5000 V. For each of the tests using the flexible smoothing blades (both one and two sides coated), voltage was reduced to nearly 0 V when the conductive layer was in contact with the wet coating. When the conductive layer was away from the wet coating, the remaining voltage was approximately 1000 V, which was still well below the charge required to generate a spark under the existing conditions. With respect to durability, the conductive layer was not removed from any of the flexible smoothing blades as a result of the testing.

What is claimed is:

1. A method for producing a magnetic recording medium while minimizing electrostatic charge buildup on the medium during production, comprising the steps of:

a) applying a liquid material over a surface of a moving web to form a continuous wet coating thereon; and b) smoothing the wet coating with a flexible blade having two major surfaces, the flexible smoothing blade comprising a conductive layer and being positioned so that a portion of one major surface is in contact with the wet coating so that electrostatic charge on the coated web is dissipated.

2. The method of claim 1, wherein the flexible smoothing blade comprises a substrate having two major surfaces and the conductive layer is provided on at least one major surface of the substrate.

3. The method of claim 2, wherein the conductive layer comprises an electrically conductive material and a polymeric binder.

4. The method of claim 3, wherein the conductive material is vanadium oxide.

5. The method of claim 4, wherein the vanadium oxide comprises whisker-shaped particles having a length of at least about 1.0 micron.

6. The method of claim 5, wherein the polymeric binder is selected from the group consisting of a sulfonated polymer, a polyurethane, an acrylate, and a cellulosic.

7. The method of claim 5, wherein the polymeric binder is a sulfonated polymer.

8. The method of claim 7, wherein the concentration of vanadium [V] in the conductive layer is in the range from 1 to 20 mg/m$^2$.

9. The method of claim 2, wherein the flexible smoothing blade further comprises a protective layer over the conductive layer.

10. The process of claim 9, wherein the conductive layer comprises a metallic element selected from the group consisting of aluminum, gold, and copper.

11. An apparatus for producing a magnetic recording medium while minimizing electrostatic charge buildup on the medium during production, comprising:

a) means for applying a liquid material over a surface of a moving web to form a continuous wet coating thereon; and b) means for smoothing the wet coating, the smoothing means comprising a flexible blade having two major surfaces, wherein the flexible smoothing blade comprises a conductive layer and is positioned so that a portion of one major surface is in contact with the wet coating so that electrostatic charge on the coated web is dissipated.

12. The apparatus of claim 11, wherein the flexible smoothing blade comprises a substrate having two major surfaces and the conductive layer is provided on at least one major surface of the substrate.

13. The apparatus of claim 12, wherein the conductive layer comprises an electrically conductive material and a polymeric binder.

14. The apparatus of claim 13, wherein the conductive material is vanadium oxide.

15. The apparatus of claim 14, wherein the vanadium oxide comprises whisker-shaped particles having a length of at least about 1.0 micron.

* * * * *

UNITED STATES PATENT AND TRADEMARK OFFICE
CERTIFICATE OF CORRECTION

PATENT NO. : 5,449,525

DATED : 9/12/95

INVENTOR(S) : DAVID J. LUNDBERG, DAVID R. BOSTON, DELBERT L. OLSON, WILLIAM L. KAUSCH

It is certified that error appears in the above-indentified patent and that said Letters Patent is hereby corrected as shown below:

On the Title page, item [54] and in Col. 1, "CATING" should read --COATING--.

Signed and Sealed this

Sixteenth Day of January, 1996

Attest:

BRUCE LEHMAN

*Attesting Officer*        *Commissioner of Patents and Trademarks*